(12) United States Patent
Akhavain Mohammadi et al.

(10) Patent No.: US 11,777,844 B2
(45) Date of Patent: Oct. 3, 2023

(54) DISTRIBUTING INFORMATION IN COMMUNICATION NETWORKS

(71) Applicants: Mehdi Arashmid Akhavain Mohammadi, Ottawa (CA); Michael Mayer, Ottawa (CA); Peter Ashwood-Smith, Gatineau (CA)

(72) Inventors: Mehdi Arashmid Akhavain Mohammadi, Ottawa (CA); Michael Mayer, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 16/920,569

(22) Filed: Jul. 3, 2020

(65) Prior Publication Data

US 2022/0006731 A1    Jan. 6, 2022

(51) Int. Cl.
*H04L 45/00* (2022.01)
*H04L 47/122* (2022.01)
*H04L 47/25* (2022.01)
*H04L 45/02* (2022.01)

(52) U.S. Cl.
CPC ............ *H04L 45/32* (2013.01); *H04L 45/02* (2013.01); *H04L 45/26* (2013.01); *H04L 47/122* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 7,177,295 B1* | 2/2007 | Sholander | H04W 40/26 370/338 |
| 2001/0032272 A1* | 10/2001 | Fujita | H04L 45/12 709/241 |

(Continued)

FOREIGN PATENT DOCUMENTS

| | | |
|---|---|---|
| CN | 101682552 A | 3/2010 |
| CN | 103210617 A | 7/2013 |

(Continued)

OTHER PUBLICATIONS

Yan et al., A Novel Routing Scheme for LEO Satellite Networks based on Link State Routing, 2014, IEEE, pp. 876-880. (Year: 2014).*

(Continued)

*Primary Examiner* — Nicholas Sloms

(57) ABSTRACT

Methods and apparatus for distributing link state information are provided. Network nodes propagate link state information via a control plane flooding operation. A first network node can initiate this propagation in response to a local link state change. In addition, some network nodes can via data plane messaging to transmit link state information to a remote node of the network. The remote node responds to the message by initiating a control plane flooding operation at that location. The remote node can be selected based on a variety of criteria, such as network traffic conditions, location, or network topology. Multiple remote nodes can be prompted in this manner to initiate flooding operations.

20 Claims, 14 Drawing Sheets

(56) References Cited

U.S. PATENT DOCUMENTS

| | | | |
|---|---|---|---|
| 2005/0094620 A1* | 5/2005 | Calcev | H04L 45/32 370/351 |
| 2007/0047462 A1 | 3/2007 | Collins et al. | |
| 2007/0091828 A1* | 4/2007 | Ashwood-Smith | H04L 29/12783 370/256 |
| 2008/0056157 A1* | 3/2008 | Retana | H04L 45/04 370/254 |
| 2008/0144644 A1* | 6/2008 | Allan | H04L 41/12 370/401 |
| 2009/0316617 A1 | 12/2009 | Ichinohe | |
| 2012/0075988 A1* | 3/2012 | Lu | H04L 45/66 370/218 |
| 2012/0170449 A1* | 7/2012 | Nakash | H04L 45/28 370/225 |
| 2013/0070637 A1 | 3/2013 | Lindem, III et al. | |
| 2013/0198558 A1* | 8/2013 | Rao | H04L 45/02 709/227 |
| 2013/0208624 A1* | 8/2013 | Ashwood-Smith | H04L 45/12 370/255 |
| 2013/0250808 A1* | 9/2013 | Hui | H04W 40/28 370/255 |
| 2014/0254427 A1 | 9/2014 | Chen et al. | |
| 2014/0369233 A1 | 12/2014 | Lin | |
| 2015/0092594 A1 | 4/2015 | Zhang et al. | |
| 2015/0244607 A1* | 8/2015 | Han | H04L 45/64 370/254 |
| 2016/0337233 A1* | 11/2016 | Lu | H04L 45/122 |
| 2018/0183706 A1 | 6/2018 | Przygienda et al. | |
| 2019/0181947 A1* | 6/2019 | Schloemer | H04B 7/18556 |
| 2019/0312805 A1 | 10/2019 | Li | |
| 2020/0220803 A1 | 7/2020 | Zheng et al. | |
| 2021/0119910 A1 | 4/2021 | Chen et al. | |

FOREIGN PATENT DOCUMENTS

| | | | |
|---|---|---|---|
| CN | 102273141 B | 9/2015 | |
| CN | 104521192 B | 1/2018 | |
| CN | 112272142 A | 1/2021 | |
| WO | WO-2008130620 A1 * | 10/2008 | ........... H04L 12/437 |
| WO | 2020165627 A1 | 8/2020 | |

OTHER PUBLICATIONS

Internet Engineering Task Force (IETF), Standards Track document numbered RFC 2328; "OSPF Version 2"; Apr. 1998.

Internet Engineering Task Force (IETF), Standards Track document numbered RFC 5340; "OSPF for IPv6"; Jul. 2008.

Internet Engineering Task Force (IETF), Standards Track document numbered RFC 5709; "OSPFv2 HMAC-SHA Cryptographic Authentication"; Oct. 2009.

Internet Engineering Task Force (IETF), Standards Track document numbered RFC 6549; "OSPFv2 Multi-Instance Extensions"; Mar. 2012.

Internet Engineering Task Force (IETF), Standards Track document numbered RFC 6845; "OSPF Hybrid Broadcast and Point-to-Multipoint Interface Type"; Jan. 2013.

Internet Engineering Task Force (IETF), Standards Track document numbered RFC 6860; "Hiding Transit-Only Networks in OSPF"; Jan. 2013.

Internet Engineering Task Force (IETF), Standards Track document numbered RFC 7474; "Security Extension for DSPFv2 When Using Manual Key Management"; Apr. 2015.

Internet Engineering Task Force (IETF), Standards Track document numbered RFC 7503; "OSPFv3 Autoconfiguration"; Apr. 2015.

Internet Engineering Task Force (IETF), Standards Track document numbered RFC 8042; "OSPF Two-Part Metric" Dec. 2016.

Internet Engineering Task Force (IETF), Standards Track document numbered RFC 8362; "OSPFv3 Link State Advertisement (LSA) Extensibility"; Apr. 2018.

Jacquet et al., Optimized Link State Routing Protocol for Ad Hock Networks, IEEE 2001, pp. 62-68.

Clausen et al., Optimized Link State Routing Protocol (OLSR), Network Working Group, Request for Comments: 3626, Oct. 2003, 75 pages.

Goyal et al., Improving Convergence Speed and Scalability in OSPF: A Survey, IEEE Communications Surveys & Tutorials, vol. 14, No. 2, Second Quarter 2012, pp. 443-463.

* cited by examiner

DISTRIBUTING INFORMATION IN COMMUNICATION NETWORKS

CROSS-REFERENCE TO RELATED APPLICATIONS

This is the first application filed for the present invention.

FIELD OF THE INVENTION

The present invention pertains to data networks, such as but not necessarily limited to satellite mesh networks, and in particular to a method and apparatus for communicating information such as link state information between nodes of such data networks.

BACKGROUND

Modern networks rely on the use of packet data transfer protocols to carry data through an interconnection of packet data processing nodes. Such nodes typically include Routers or Switches and can be connected in numerous topologies such as point-to-point, star, or mesh. These nodes will have multiple interfaces either to provide connection of the user to the network, or to provide interconnection to other nodes in the network. In addition to supporting the transport of user data (in the "data plane"), these nodes also support protocols that for the control and management of the network elements and their related protocols (the "control plane").

End user traffic is typically sent over this network in packets with each packet containing its sending (source) address and the address of the intended destination. In the general case, the destination of the data transfer is to a user that is remote from the local node and must therefore travel over multiple network nodes. In this case, the node must receive a packet, read the address information and decide which interface to send the packet. Because a network can have multiple interconnected nodes, each network node maintains a table that provides the information necessary for the switch to route the packet to the correct destination. This information will include at a minimum, the link needed (e.g. the network interface to use to forward a packet) in order that a packet will reach its specific destination address.

To simplify network design, protocols provide a high degree of automation of the network paths. Each node will form a representation of the network (a network graph) though the exchange of link adjacency messages. The use of common algorithms allows each device to derive the same network topology graph. From this graph, the network nodes can then develop a routing table which will provide information on what interface should be used to reach a specific destination address or to reach a set of addresses (e.g. a subnetwork).

When a link in the network becomes unavailable, ether due to link failures or to congestion, the network topology changes. Existing routing tables may no longer be valid, if they originally included routes over the failed link. During this state, the network operates at a degraded level until the routing tables can be updated. Again, to automate this process, link state protocols periodically exchange messages.

For example, according to one protocol, when a node detects a link failure, it will send this information to the nodes immediately connected to it. An example is the Open Shortest Path First (OSPF) protocol. Nodes receiving link state update messages will update their routing tables if necessary. If the message is a new link state message, these nodes will then forward the message to further nodes that are immediately connected to it, and the process repeats. Note, for large networks, there may be multiple paths to reach a given node. For this reason, a node may receive duplicate link state messages. The process of sending link state information from a node is referred to as flooding, since the progression of table updates flows (floods) out from the area where the network issue (failure or congestion) is detected.

Because this process involves the use of message exchange, the time required to update the network is proportional to the size of the network and, thus, larger networks will operate in a degraded mode for a longer period of time then smaller networks that have fewer nodes.

Furthermore, in networks that may be subject to repeated outages, for example, that may be present in a (e.g. Low Earth Orbit) satellite network, the period of time during which the network operates in a degraded mode can be a significant due to network topology changes occurring prior to completion of a previous topology update.

Therefore, there is a need for a method and apparatus for communicating link state information that obviates or mitigates one or more limitations of the prior art, for example by reducing the amount of time the network is in the degraded mode.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for distributing information, e.g., preferential flooding of link state information, in communication networks. The preferential flooding uses data plane messaging to initiate flooding of a link state information update at multiple locations in the network, in order to more rapidly disseminate this information through the network. The increase in speed of network topology updates can improve stability and performance of the network.

In accordance with embodiments of the present invention, there is provided a method for distributing link state information in a communication network. The method is performed by a first network node. The method includes, upon detection of a local link state change: initiating a local flooding operation, and also concurrently initiating express messaging. In the local flooding operation, first messages are propagated, via control plane messaging, outward from the first network node to second network nodes which are local to the first network node. The first messages indicate the local link state change, and are typically usable for updating routing rules at the second network nodes. The express messaging includes transmitting, using data plane messaging, a second message to a third network node which is remote from the first network node. The second message is configured to cause the third network node to initiate a second flooding operation in which third messages are propagated, via control plane messaging, outward from the third network node to fourth network nodes which are local to the third network node. The third messages indicate the local link state change, and are also typically usable for updating routing rules at the additional network nodes.

In accordance with embodiments of the present invention, there is provided another method for distributing link state information in a communication network. The method is performed by a network node which is typically remote from a link state change. The method includes receiving, via data plane messaging, an express message from another network node (for example the first node as mentioned above) which is remote from the network node. The express message indicates a link state change for a communication link which is local to the other network node. The method further includes, upon receipt of the message, initiating a flooding operation in which further messages are propagated, via control plane messaging, outward from the network node to second network nodes which are local to the network node. The further messages indicate the local link state change, and are typically usable for updating routing rules at the second network nodes.

In accordance with embodiments of the present invention, there is provided an apparatus in a first network node of a communication network. The apparatus includes a network interface and processing electronics. The apparatus is configured, upon detection of a local link state change, to initiate a local flooding operation, and also to initiate express messaging. In the local flooding operation, first messages are propagated, via control plane messaging and the network interface, outward from the first network node to second network nodes which are local to the first network node. The first messages indicate the local link state change and are typically usable for updating routing rules at the second network nodes. To implement the express messaging, the apparatus is configured to transmit, using data plane messaging and the network interface, a second message to a third network node which is remote from the first network node. The second message is configured to cause the third network node to initiate a second flooding operation. In the second flooding operation, third messages are propagated, via control plane messaging, outward from the third network node to fourth network nodes which are local to the third network node. The third messages indicate the local link state change and are typically usable for updating routing rules at the additional network nodes.

According to various embodiments, the third node is selected based on an indication of network traffic patterns. In some embodiments, the third node is selected as a network node proximate to or along a network path which carries heavy network traffic toward the local link. In some embodiments, the third node is selected based on physical location, network location, or both. In some embodiments, the third node is selected to be in a region which is far from the first node in terms of network distance. In some embodiments, the third node is selected to be in a same region as the first node, said region circulating a heavy amount of network traffic. In some embodiments, a network connection is established between the first node and the third node prior to detection of the local link state change. In some embodiments, a network connection is established between the first node and the third node in response to detection of the local link state change. In some embodiments, some or nodes of the network are satellite-based nodes.

In accordance with embodiments of the present invention, there is provided an apparatus in a first network node of a communication network. The apparatus includes a network interface and processing electronics. The apparatus is configured to receive, via data plane messaging, a message from another network node (e.g. the first network node mentioned above) which is remote from the network node. The message indicates a link state change for a communication link which is local to the other network node. The apparatus is configured, upon receipt of the message, to initiate a flooding operation in which further messages are propagated, via control plane messaging, outward from the network node to second network nodes which are local to the network node. The further messages indicate the local link state change, and are typically usable for updating routing rules at the second network nodes.

Embodiments of the present invention may be used to improve routing of packet based data over a network of dynamically changing topology. The network may be or include a non-terrestrial (Satellite) network used to provide global coverage for communications services for a variety of uses such as end-to-end data or voice communication or for augmenting existing wireless network.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention relate to updating of link state information in a communication network. Although this can be applied in principle to any type of communication network, the invention is discussed primarily with respect to satellite mesh networks, for example where some or all of the satellites are in low earth orbit. Other scenarios involve networks involving satellites at two or more altitudes, and satellites in combination with ground stations. The invention can also be applied to other types of networks, for example terrestrial mesh networks with relatively mobile stations, such as UEs in an urban environment. The invention can be applied to wireless or wireline networks, such as 5G networks and Internet of Things (IoT) networks. For example, if there are significant network routes in common usage by served areas, for example between large cities, or to cloud-based radio access network (CRAN) serving areas, link state updates can be prioritized so that they occur in these served areas or along these routes.

The need to increase flooding efficiency (speed and reduction messages) when disseminating link state update information becomes increasingly important in terrestrial networks as line data rates increase (e.g. more packets per second). To maintain the same packet loss performance if the network, a reduction in flooding time would also be required. This reduction would also hold true in data center applications.

Figure 1A:
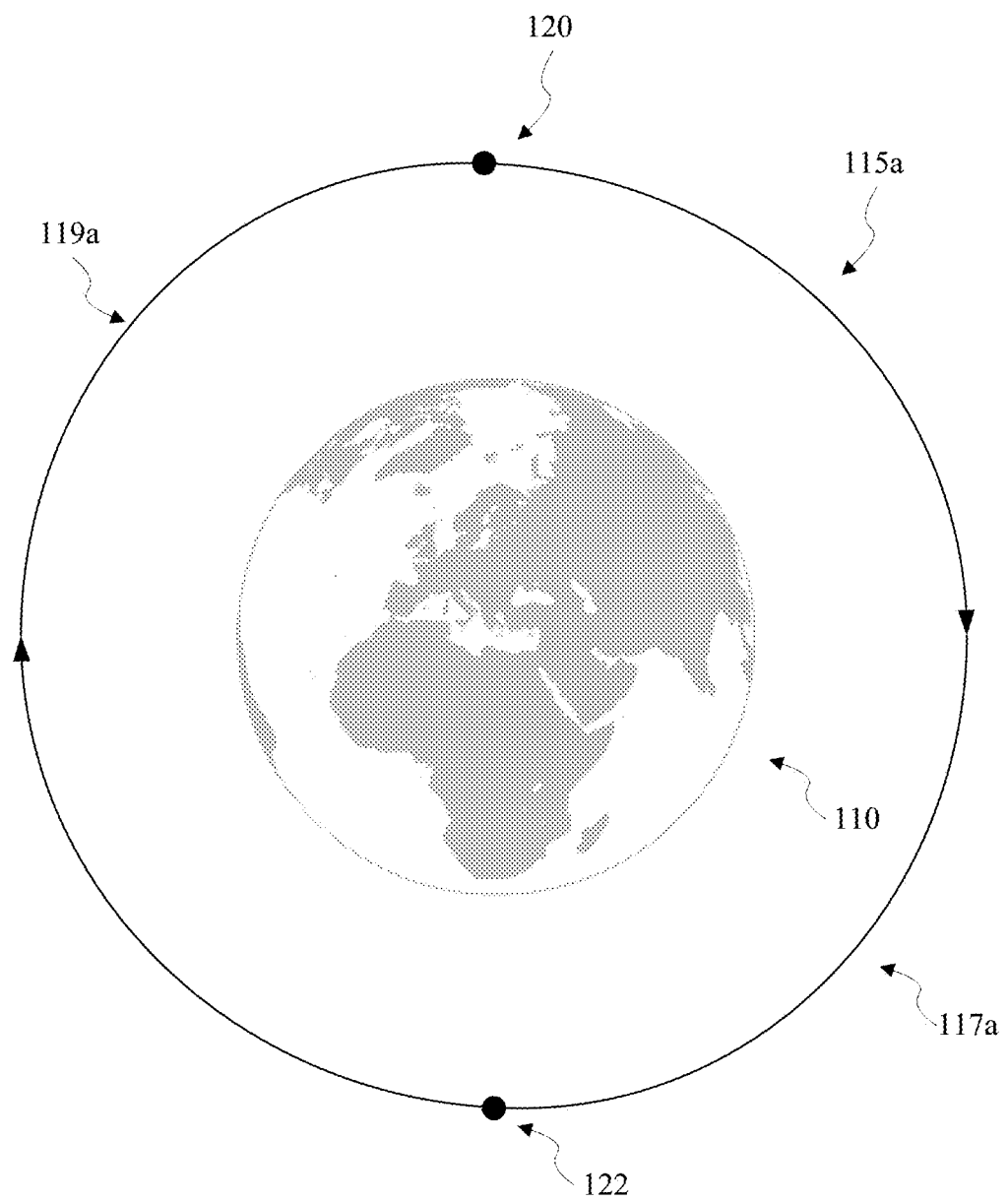
FIG. 1A illustrates a cross section of a sphere representing earth, with a satellite orbit.

For a satellite mesh network, while it is desirable to arrange satellites in a constellation so that they are relatively stationary with respect to one another, such an arrangement is challenging. This is demonstrated as follows. FIG. 1A illustrates a cross section of a sphere 110 representing earth, with a satellite orbit 115a. Multiple satellites may follow this orbit, e.g. in a spaced-apart configuration. The orbit passes through two opposing points 120, 122 and is said to include, for purposes of the present discussion, a descending part 117a where the satellite(s) in the orbit passes from point 120 to 122, and an ascending part 119a where the satellite(s) in the orbit passes from point 122 to 120.

Figure 1B:
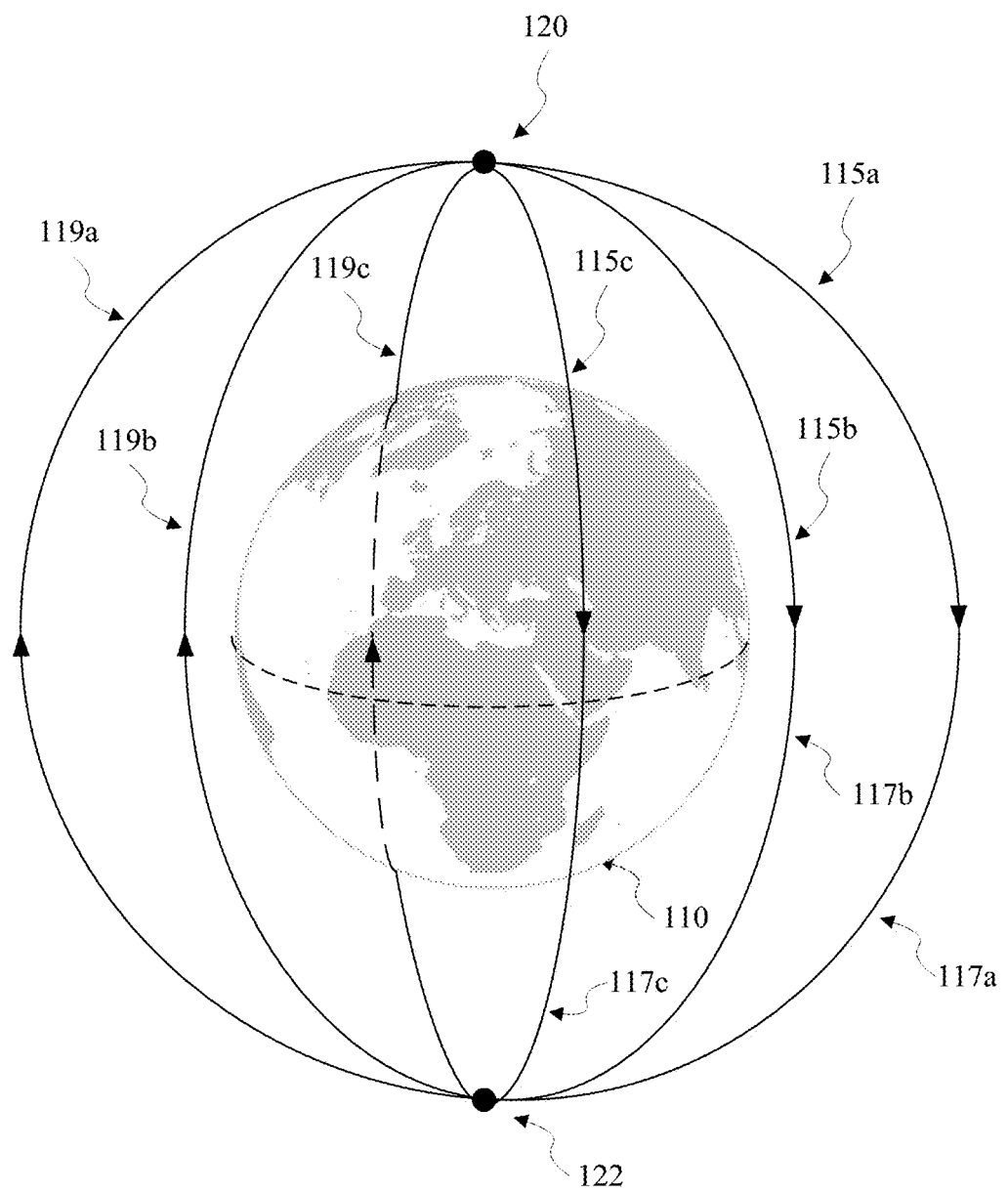
FIG. 1B illustrates the sphere of FIG. 1A with multiple orbits arranged along different meridians.

FIG. 1B illustrates the sphere 110 with multiple orbits 115a, 115b, 115c arranged along different meridians. Although three orbits are shown for simplicity, additional such orbits may also be provided. Each orbit passes through points 120 and 122. Each orbit also has a descending part 117a, 117b, 117c and an ascending part 119a, 119b, 119c. However, even though the satellites in each orbit travel in the same direction as the satellites travelling in at least one other neighbouring orbit, there are two instances where the satellites in one orbit travel in the opposite direction to the satellites travelling in a neighbouring orbit. For example, the descending part 117a of orbit 115a is adjacent to the ascending part 119c of orbit 115c, and the descending part 117c of orbit 115c is adjacent to the ascending part 119a of orbit 115a. Therefore, communicating from satellites in orbit 115a to satellites in orbit 115c is challenging, due to potentially rapid relative motion between such satellites. A seam is defined between the orbits 115a and 115c, and it is said that communication across the seam is technically challenging. Furthermore, communication links across the seam are temporary, and when such links are made or broken other network nodes need to be aware of this for routing purposes. Disseminating the corresponding link state information via conventional flooding would be problematic due to the rate of messaging required.

Figure 1C:
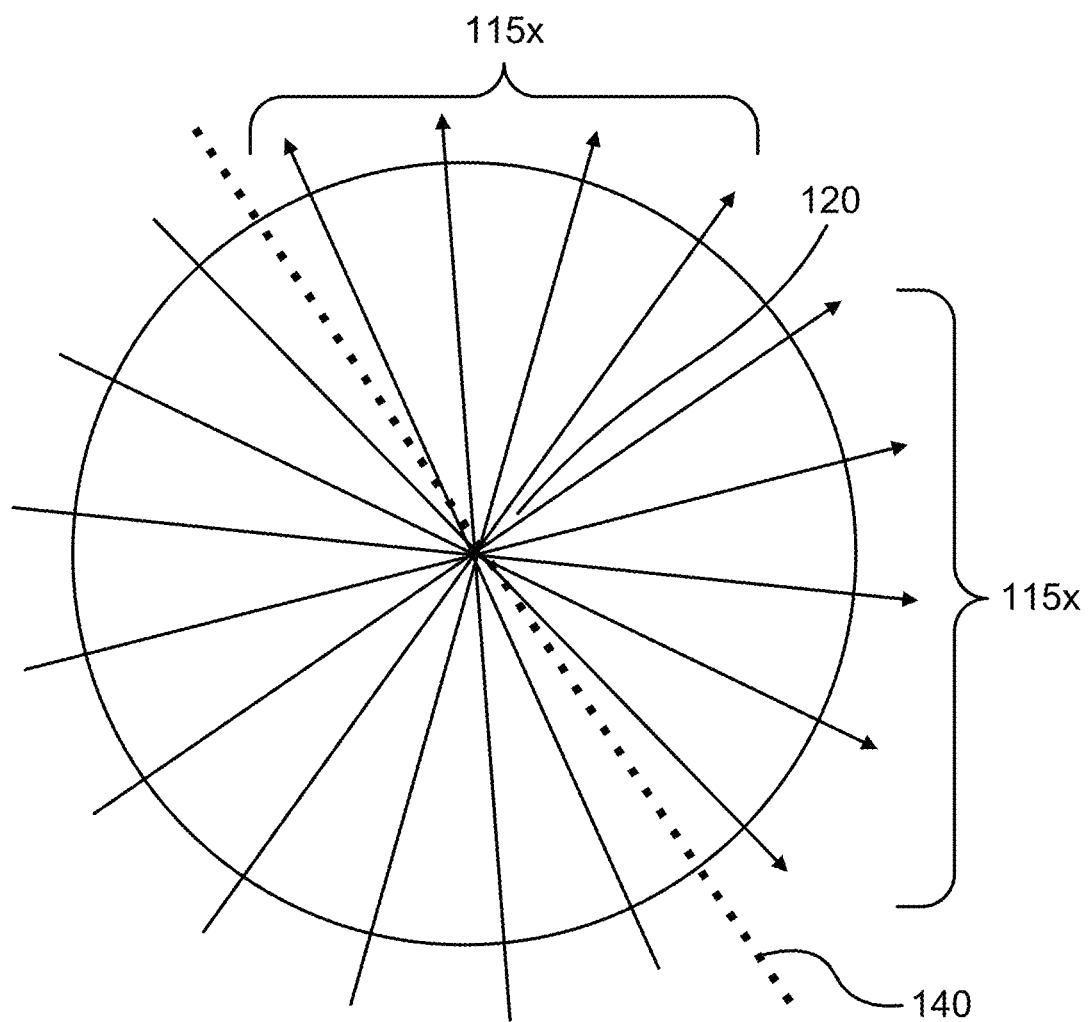
FIG. 1C illustrates a polar view of the sphere of FIG. 1A, with additional orbits arranged along different meridians.

FIG. 1C illustrates a version of FIG. 1B, extended to show more satellite orbits, as would be the case in a satellite network providing continuous ground coverage. It is useful to view the orbits on a polar plot, such that the point 120 is displayed at center. Here, all orbits 115x ascend towards point 120. It should be noted that a region 140 exists where satellites on adjacent orbits are travelling in opposite directions. This region is called the seam and it is said that communication across the seam is technically challenging.

Figure 2:
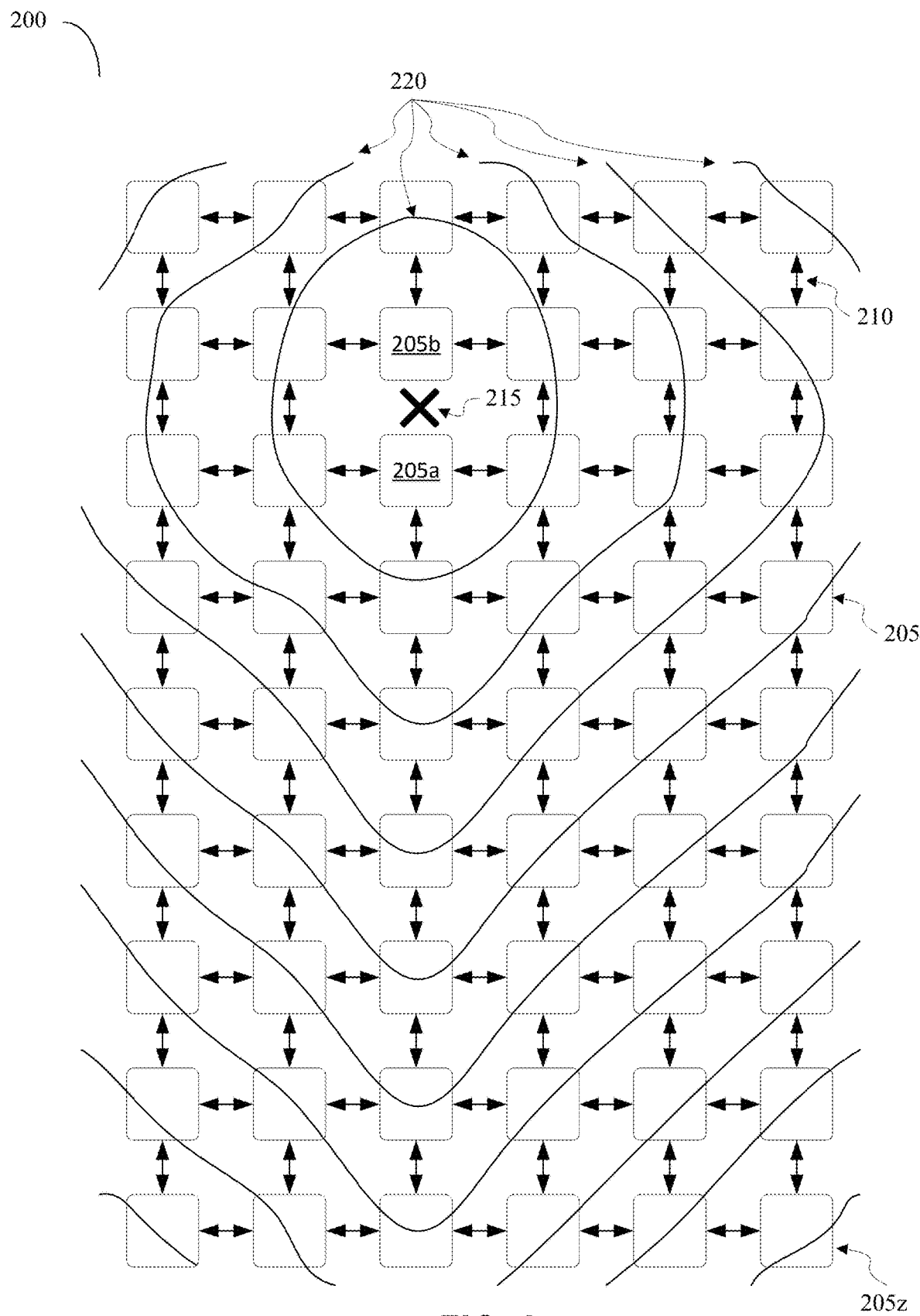
FIG. 2 illustrates a network in which link state information updates are communicated using a conventional flooding protocol.

FIG. 2 illustrates a network 200 in which link state information updates are communicated using a conventional flooding protocol. The network includes nodes 205 (one example node labeled) interconnected to adjacent nodes via links 210 (one example link labeled) in a mesh configuration. Upon failure of a link 215, the nodes 205a, 205b initiate a flooding procedure for propagating new link state information through the network. In particular, the new link state information indicates that the link 215 is unavailable. The flooding procedure involves each of the nodes 205a and 205b transmitting a control plane message (including the new link state information) to each node that is directly connected to it via a link. The nodes receiving the control plane message process the message and forward the control plane message to further nodes that are adjacent (directly connected via links) to those nodes. Upon receipt of the control plane message, the nodes can also update their routing tables and network topology information. Nodes can avoid propagating the control plane message when the same message has been received before.

According to this procedure, the control plane message is propagated in a hop-by-hop manner outward from the nodes 205a, 205b until all of the network nodes have received the message. The final node to be updated is node 205z. Lines 220 connect nodes that are updated at substantially the same time. These lines 220 represent a wave of propagation of control plane messages outward from the failed link 215 in the flooding protocol.

Figure 3:
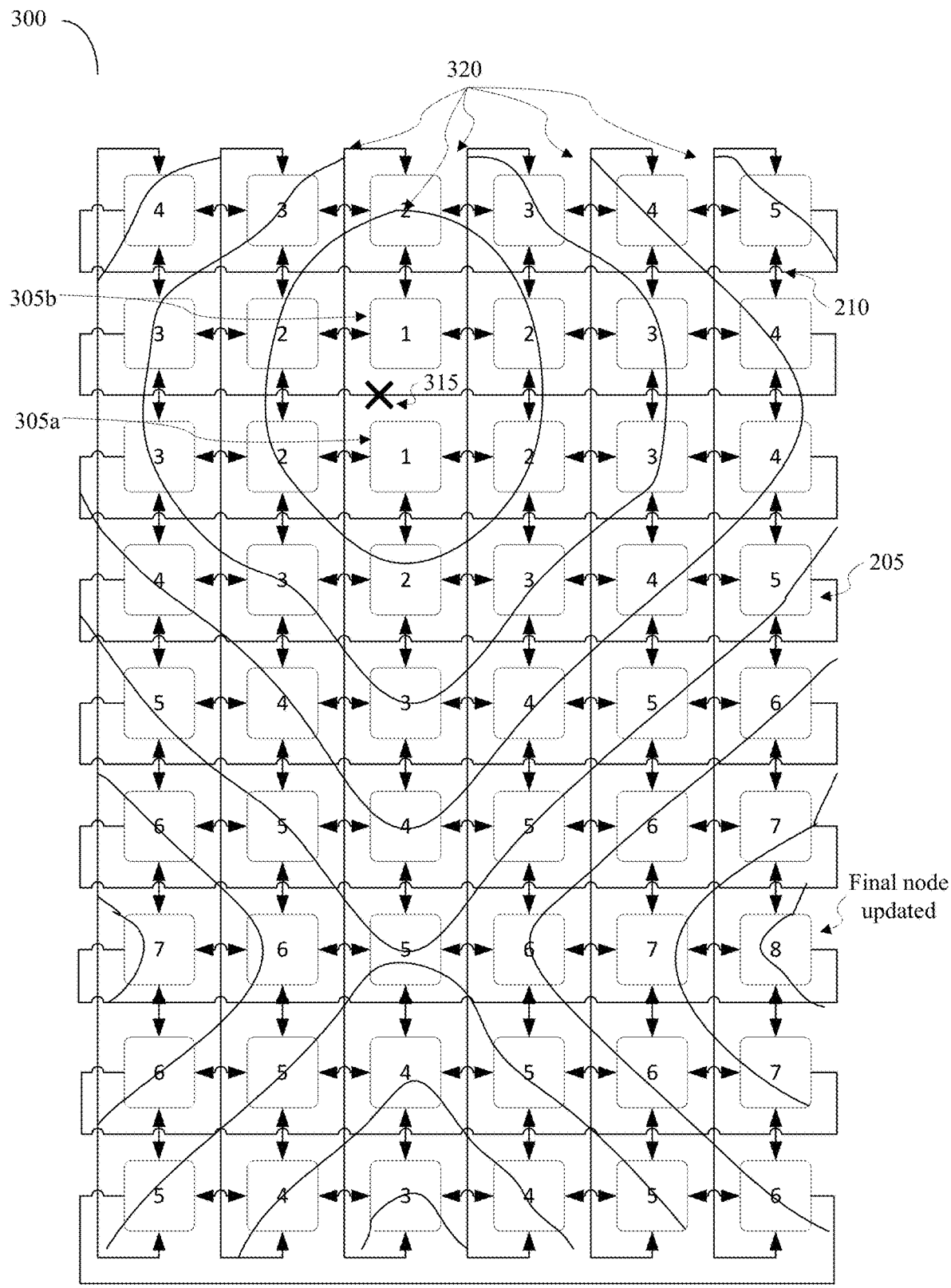
FIG. 3 illustrates another example of a network implementing conventional flooding.

FIG. 3 illustrates another example of a network 300 implementing conventional flooding. In this case, nodes at the top of the figure are directly connected via links to nodes at the bottom, and nodes at the left of the figure are directly connected via links to nodes at the right. This scenario is applicable to a spherical network topology, such as a global network of satellites. Upon failure of a link 315, the nodes 305a, 305b initiate a flooding procedure for propagating new link state information through the network. Numbers in each node represent the number of steps of the repeated flooding procedure (the number of nodes the control plane message passes through) before that node receives the new link state information. Lines 320 connect nodes that are updated at substantially the same time.

The control plane messaging procedure may occur for example according to the OSPF protocol, which requires control plane processing of link state update messages at each node before forwarding. For example, a node in receipt of the link state update message may be required to pass the message to the control plane for processing, in order to determine whether further action is needed and if the packet should be forwarded or not. This control plane processing requirement adds significant delay and slows propagation of the link state update messages in the conventional node-by-node manner. A control plane message may be communicated using the same resources as data plane messages; however such messages are marked so that, upon receipt by a node, they are diverted for internal processing by that node, according to one or more control plane procedures. The control plane procedures may include, for example, opening the message and processing its contents, and performing one or more control plane actions based on the processing. Control plane actions may include determining whether to update routing rules, routing tables, network representations, etc., and determining whether or not to re-submit the message for forwarding to other nodes. Notably, these control plane procedures can occur at every node which handles the message.

At a given node, the node-by-node flooding procedure can be described generally as transmitting, using control plane messaging, one or more messages to further network nodes which are local to the given network node. Locality typically refers to direct connection via communication links. The messages indicate a link state change, and are usable for updating routing rules at the further network nodes. The further network nodes may be configured to propagate, where necessary, the one or more messages to additional network nodes which are local to them. Additionally or alternatively, the flooding procedure can be described as being an operation in which messages are propagated, via control plane messaging, outward from the given network node to further network nodes which are local to the given network node. The messages indicate the link state change, and are usable for updating routing rules at the second network nodes.

To supplement the node-by-node flooding procedure, embodiments of the present invention use data plane messaging to initiate multiple instances of the flooding procedure at different locations in the network. A first node, typically but not necessarily the node which detects a state change in a local link that this node is directly connected to, transmits, using data plane messaging, a message (referred to herein as an express message) to another network node which is remote from the first node (referred to as the target node). A (e.g. pre-established) network connection or socket used to convey the express message is referred to as the express path. Remote in this sense means that the nodes are separated by more than one intermediate node. The express message indicates a (e.g. local) link state change. The express message causes the target node to initiate a local flooding operation beginning at that target node.

The first node also typically initiates the local flooding procedure concurrently with the transmission of the express message. Express messages can be transmitted to more than one target node.

In some embodiments, the express message is a data plane message which encapsulates or otherwise represents the conventional control plane flooding message, along with an implicit or explicit instruction for the recipient of the express message to initiate flooding via control plane messaging.

Figure 4A:
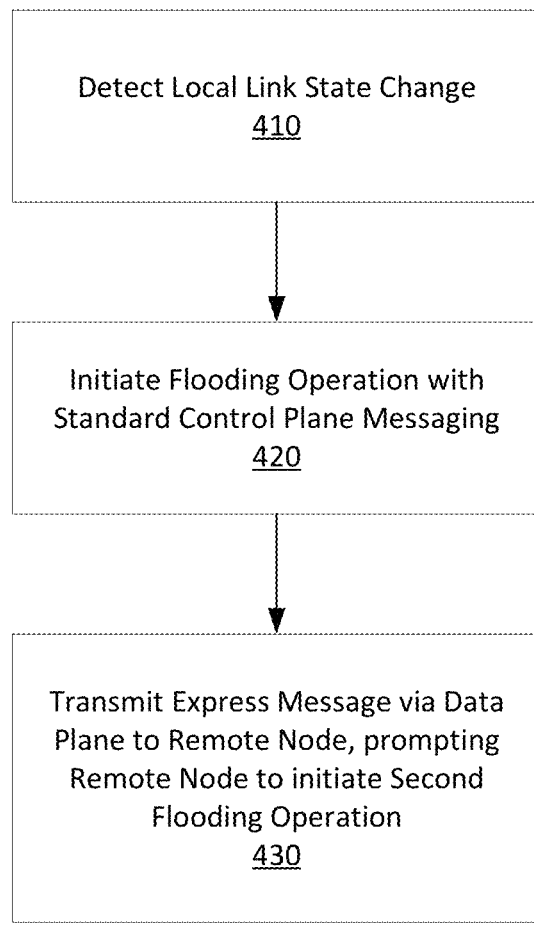
FIG. 4A illustrates a method for distributing link state information in a communication network, according to an embodiment of the present invention.

Accordingly, referring to FIG. 4A, embodiments of the present invention provide a method 400 for distributing link state information in a communication network. This distribution maintains the link state information across nodes of the network. The method includes, by a first network node, upon detection 410 of a local link state change, initiating 420 a flooding operation in which first (standard) messages are propagated, via control plane messaging, outward from the first network node to second network nodes which are local to the first network node. The first messages indicate the local link state change. The first messages are usable, for example, for updating routing rules at the second network nodes. In other words, the method includes transmitting to the second nods, using control plane messaging, messages indicating the local link state change. Each of the second nodes is further configured to propagate the messages to additional network nodes, typically nodes that are local to that second network node.

The method further includes transmitting 430, using data plane messaging, a second (express) message to a third network node which is remote from the first network node. The second message indicates the local link state change and causes the third network node to initiate a second flooding operation. In the second flooding operation, third (standard) messages are propagated, via control plane messaging, outward from the third network node to fourth network nodes which are local to the third network node. In other words, the second message prompts the third network node to transmit additional messages to fourth network nodes which are local thereto, these additional messages indicating the local link state change and prompting the fourth network nodes to propagate the flooding operation. The third messages each also indicate the local (with respect to the first node) link state change. The third messages are usable for updating routing rules at the additional network nodes. The second message may prompt the third network node to update its routing rules. It is contemplated that the third network node can also send express messages to additional non-local nodes. Multiple third network nodes can receive and act in response to express messages.

Figure 4B:
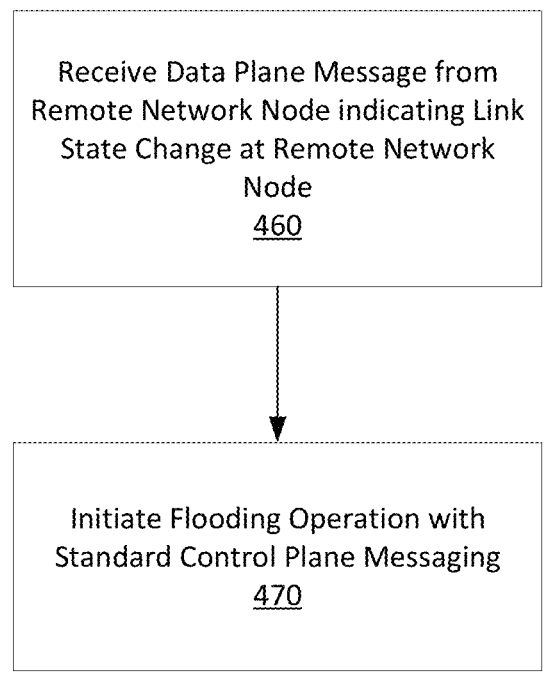
FIG. 4B illustrates a method for distributing link state information in a communication network, according to another embodiment of the present invention.

Referring to FIG. 4B, there is provided a complementary method 450 for distributing link state information in a communication network. This corresponds to operation of the third network node mentioned above. The method includes receiving 460, via data plane messaging, a message from another network node which is remote from the network node (this is the first node described in the method 400). The message indicates a link state change for a communication link which is local to the other network node. The method further includes, upon receipt of the message, initiating 470 a flooding operation in which further messages are propagated, via control plane messaging, outward from the network node to additional network nodes which are local to the network node. The further messages indicate the local link state change, and, for example, are usable for updating routing rules at the second network nodes. The further messages typically prompt the additional network nodes to propagate the flooding operation.

Figure 5:
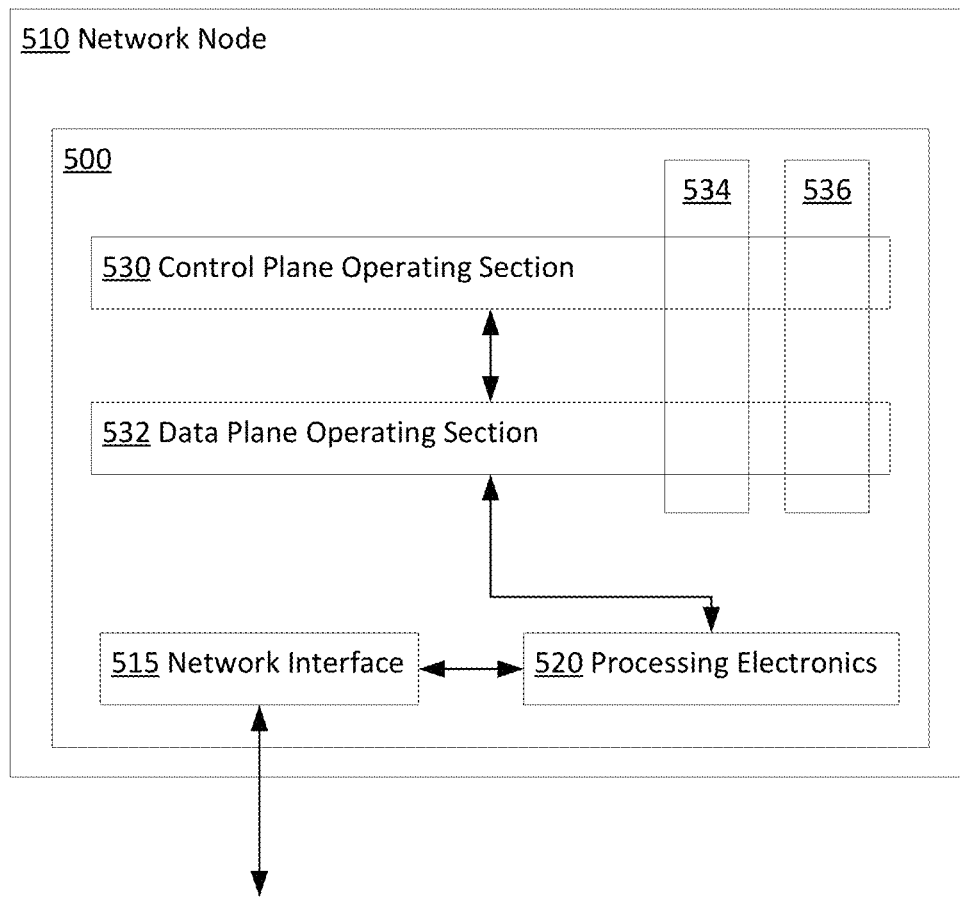
FIG. 5 illustrates a network node apparatus provided in accordance with embodiments of the present invention.

FIG. 5 illustrates an apparatus 500 provided in accordance with embodiments of the present invention. The apparatus is included as part of a network node 510 of a communication network. The apparatus includes a network interface 515 (of the network node) and processing electronics 520. The processing electronics can include a computer processor executing program instructions stored in memory. The processing electronics can include dedicated electronics, such as provided by a field programmable gate array, application specific integrated circuit, or other digital or analog electronic circuitry.

The apparatus can include a control plane operating section 530 and a data plane operating section 532. The control plane operating section 530 may update routing tables and maintain representations of network topologies in response to received messages indicative of link state changes. The control plane operating section may determine whether to forward such messages onward, for example based on whether a duplicate version of the message has been previously received. The data plane operating section 532 may receive messages and determine whether the messages are to be forwarded immediately based on address or sent to the control plane operating section for further processing. The data plane operating section may identify and send link state change messages to the control plane operating section. The data plane operating section transmits messages based on routing information maintained by the control plane operating section. Operating sections can refer to functional aspects of the apparatus, such as processes or collections of electronic components configured to perform certain actions.

The apparatus can include a standard link state change flooding operating section 534 and an express link state change flooding operating section 536. These operating sections are aspects arising from cooperation of the control plane operating section 530 and data plane operating section 532. The standard link state change flooding operating section 534 operates to initiate, handle, propagate or terminate control plane messages indicative of link state changes according to a flooding protocol as described elsewhere herein. The express link change flooding operating section 536 operates to initiate, handle or terminate express messages indicative of link state changes according to the operations as described elsewhere herein.

The apparatus may be configured to perform the operations described above with respect to the method 400. For example, the apparatus can be configured to initiate a flooding operation in which first messages are propagated, via control plane messaging and the network interface, outward from the first network node to second network nodes which are local to the first network node, the first messages indicating the local link state change. The apparatus can further be configured to transmit, using data plane messaging and the network interface, a second message to a third network node which is remote from the first network node, the second message causing the third network node to initiate a second flooding operation in which third messages are propagated, via control plane messaging, outward from the third network node to fourth network nodes which are local to the third network node, the third messages indicating the local link state change.

Additionally or alternatively, the apparatus 500 can be configured to perform the operations described above with respect to the method 450. For example, the apparatus can be configured to receive, via data plane messaging, a message from another network node which is remote from the network node, the message indicating a link state change for a communication link which is local to the other network node. The apparatus can be further configured, upon receipt of the message, to initiate a flooding operation in which further messages are propagated, via control plane messaging, outward from the network node to second network nodes which are local to the network node, the further messages indicating the link state change indicated in the message from the other (remote) node.

Figure 6:
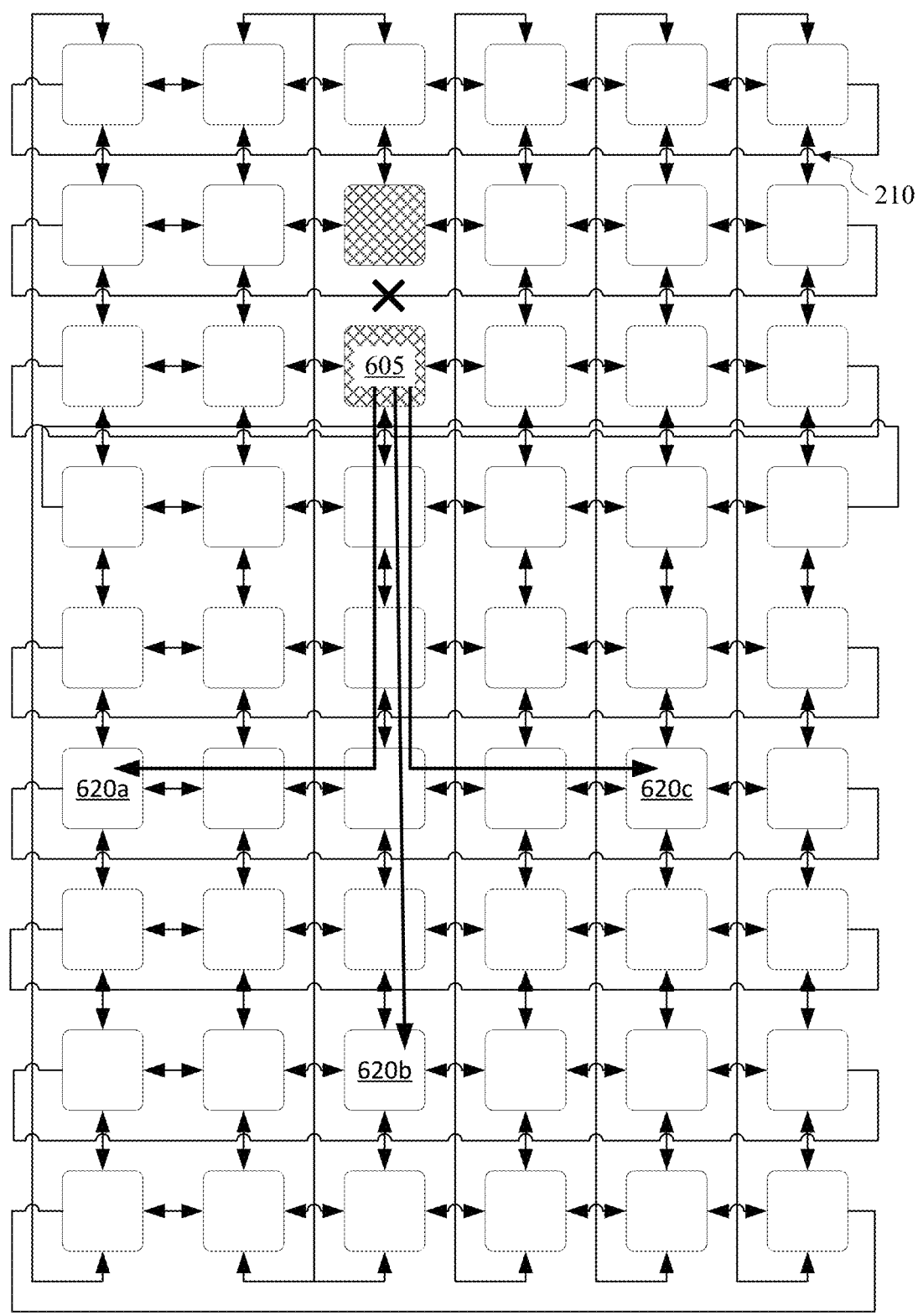
FIG. 6 illustrates part of a link state information update operation in a network, involving express messaging, according to an embodiment of the present invention.

FIG. 6 illustrates part of a link state information update operation in a network 600, according to an embodiment of the present invention. A first node 605 detects a link state change (e.g. link failure) in a link 615 that is directly connected to the first node. Upon detection of this link state change, the first node transmits, using data plane messaging, express messages to target network nodes 620*a*, 620*b*, 620*c*. Upon receipt of the express messages, each of the target network nodes 620*a*, 620*b*, 620*c* initiates a copy of the local flooding procedure, to propagate the indication of the link state change. The local flooding procedure is not shown in FIG. 6, but is similar to that of FIG. 3.

It is noted that the data plane messaging is expected to be faster than the control plane messaging associated with the conventional node-by-node flooding procedure. This is at least partially because the data plane messaging does not require one or more intermediate nodes to open and process the link state change message in the control plane. Rather, the message is passed along in the data plane without such processing. For example, a header in the message packet can be briefly inspected to determine a destination, and the message packet forwarded accordingly. The express message is passed from node to node to its destination (target network node) without control plane processing. As such, the target network nodes can be more rapidly notified, and the flooding procedure can begin from the target network nodes, more rapidly than if only the conventional control plane messaging was used.

Figure 7:
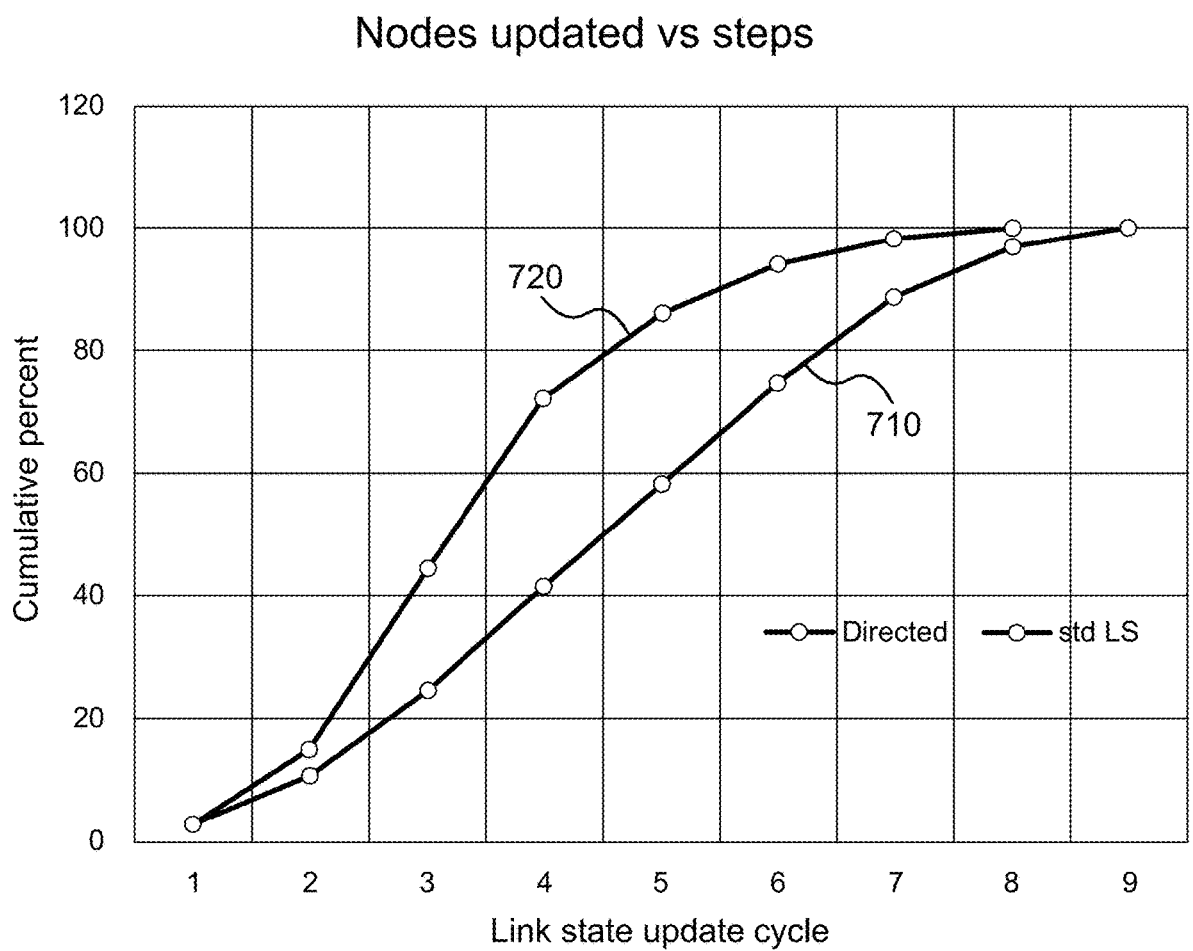
FIG. 7 illustrates a comparison between the conventional flooding procedure as illustrated for example in FIG. 3 and the flooding procedure augmented by express messaging according to an embodiment of the present invention, as illustrated for example in FIG. 6.

FIG. 7 illustrates a comparison between the conventional flooding procedure as illustrated for example in FIG. 3 and the flooding procedure augmented by express messaging according to an embodiment of the present invention, as illustrated for example in FIG. 6. The horizontal axis represents time, measured in link status update cycles. Each link status update cycle corresponds to the time taken to propagate a control plane message from one node to the next. The vertical axis represents the percentage of nodes in receipt of a link state change message. The first plot line 710 represents the proportion of nodes updated at each cycle when the conventional node-by-node flooding procedure is used. The second plot line 720 represents the proportion of nodes updated at each cycle when the node-by-node flooding procedure, augmented with express messaging, is used. As can be seen, the augmented procedure results in improved performance, in that nodes are generally updated (provided with the link status update message) sooner. That is, for each link status update cycle, a greater proportion of the network is notified of the link state update under the invention than under the conventional procedure. For purposes of FIG. 7, it is assumed that propagation of an express message takes one link status update cycle to propagate, for example from first node 605 to target network nodes 620*a*, 620*b*, 620*c*. In the example of FIG. 7, a target node was selected at a network location approximately opposite to the source of the network disturbance.

Target network nodes (also referred to as nodes which are remote from the first node), to which express messages are transmitted from a first node, can be selected (determined) in a variety of ways. For example, target network nodes can be selected randomly, or based on distance from the first node, or based on information such as traffic levels or geographic information. Target nodes can be selected based on physical location, network location, or both. Connections from the first node to the designated target network nodes can be established prior to occurrence of link state change (e.g. failure), for example using sockets, or on an as-needed basis in response to a link state change. Target network nodes can be selected dynamically in order to optimize or otherwise achieve a relatively fast and efficient process for notifying all network nodes of the link state change. The selection may be performed based on geographic regional information, data usage information, etc. Instructions for selecting target nodes can be provided based on external commands, pre-set configurations, or based on output of a control system which analyzes network traffic. When traffic distribution is regional, for example in the case of a satellite network in which traffic may be greater over specific geographic regions, the target network nodes can be selected to cover areas of high traffic, thereby improving impact of the present invention.

In some embodiments, each node maintains a table of target nodes to which it will transmit link state control information over a data plane connection, using express messages. For the purposes of the present description, this connection is referred to as an "express path" because it substantially bypasses the conventional control plane based link state update processing performed at each node.

Each target node is configured to terminate the express path connection with a "supplementary link flood" process that will allow direct interconnection to the control plane of the target node so that link state adjacency (flooding) can start from that node without being triggered by either an incoming link state control message or a local failure event. For security reasons, the functionality of this process may be tightly controlled and configured to only respond to messages with specific security credentials. Possible security credentials may relate to MAC addresses or equivalent hardware based serial numbers, for example.

In various embodiments, the table of target nodes is also updated based on link state reachability. Link state reachability may reflect whether a target node is reachable based on current link state information. If a target node is currently unreachable, an alternative target node may be selected.

As discussed above, upon detection of a link state change (e.g. link failure, congestion event, latency change, data rate change, etc.), the first node will generate a link state update message as per normal operation and begin the local link state flooding, for example as specified in Internet Engineering Task Force (IETF) document numbered RFC 2328 and entitled "OSPF Version 2," 1998). The first node typically initiates this process in response to state change in a local link, i.e. a link directly coupled to the first node. The first node will then send this same information as a control message over the pre-established express path connections to all of the target nodes listed in the target table. If pre-established connections are not being used, the first node will establish the express path (e.g. socket connection) to the target node(s) and forward the link state control message using data plane messaging. This may be performed for example upon detection of the link state change.

Figure 8:
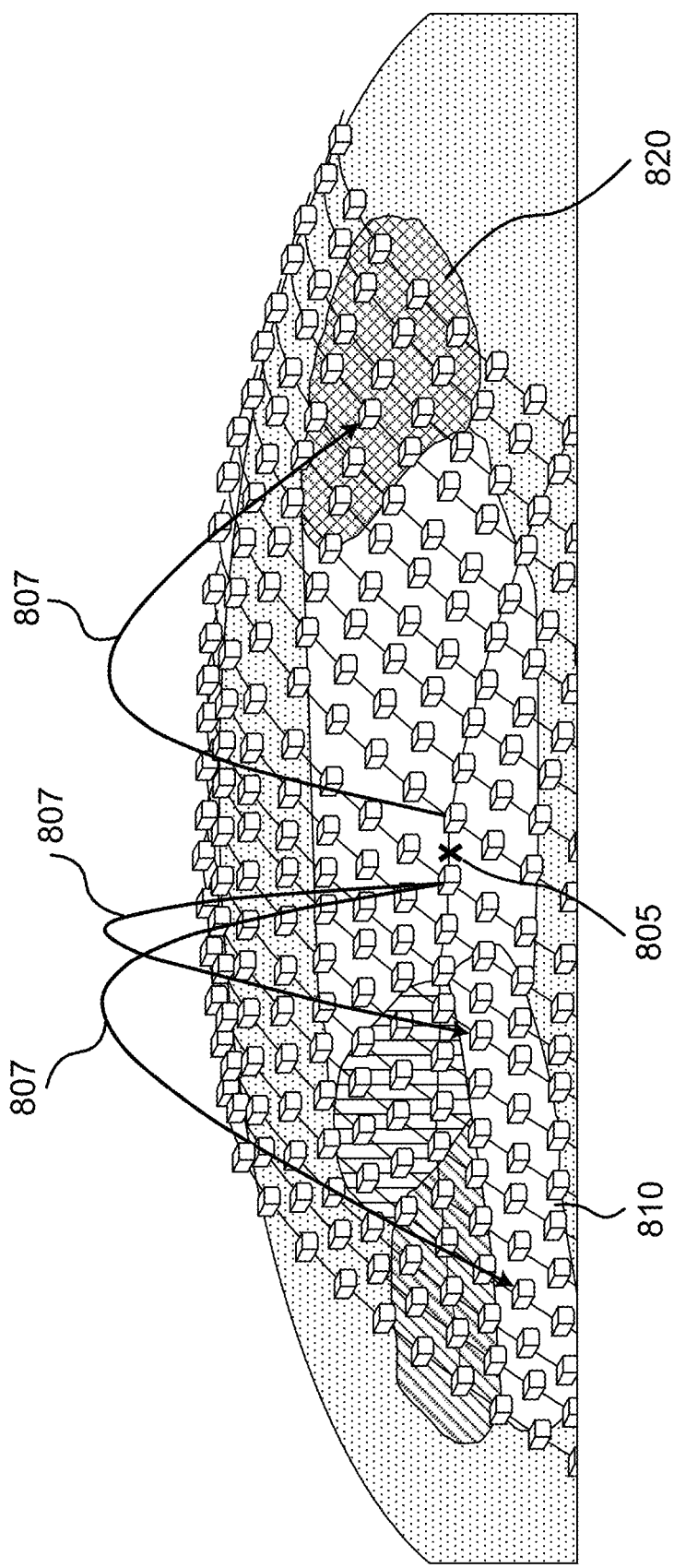
FIG. 8 illustrates a first example case in which a link state change occurs in a part of a network expected to support network activity in two areas, according to an embodiment of the present invention.

The list of target nodes may be populated based on the need to provide early link state updating to areas that are impacted by a link state change. FIG. 8 illustrates a first example case in which a link state change (link failure) 805 occurs in a part of a network expected to support network activity in two areas 810, 820. For example, this part of the network may be expected to carry high amounts of traffic between the two areas 810, 820. The network is a satellite-based network including portions overtop of the two areas 810, 820. Accordingly, the target nodes are selected to include target nodes overtop of (servicing) the two areas. As such, traffic originating in one of the two areas and destined for the other, or traffic originating in one of the two areas in general, is rerouted early on, if necessary, to avoid the link failure. Express messages 807 indicative of the link failure 805 are illustrated as being transmitted from nodes adjacent to the link failure to nodes in the two areas 810, 820. These messages are propagated through the data plane (e.g. via other satellites in the illustrated constellation).

Figure 9:
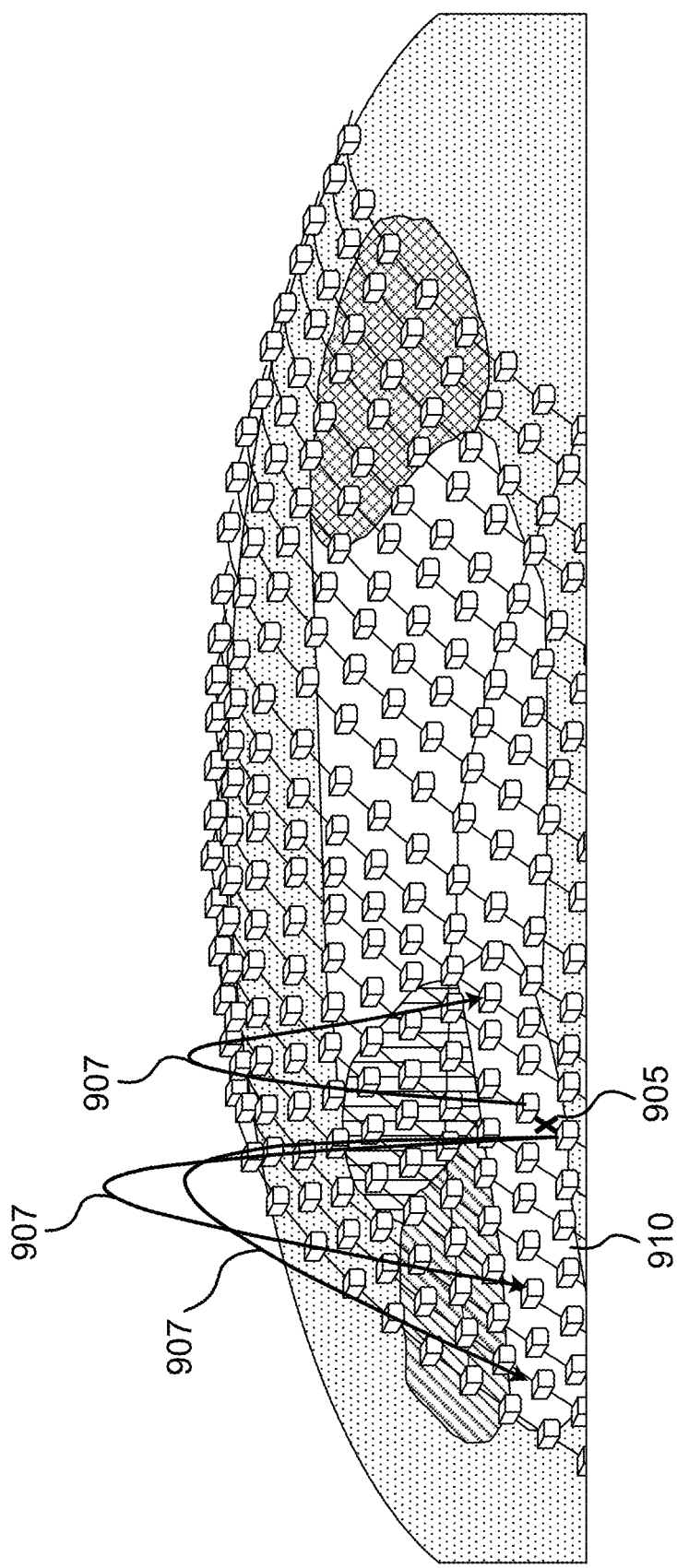
FIG. 9 illustrates a second example case in which a link state change occurs in a network servicing a single geographic area according to an embodiment of the present invention.

FIG. 9 illustrates a second example case in which a link state change (link failure) 905 occurs in a network servicing a single geographic area 910. The area may include a significant volume of internal traffic circulating therein. Accordingly, target nodes are selected to include target nodes overtop of (servicing) the area 910. Nodes serving vulnerable or isolated geographic areas can be notified of a link state change early, using express paths to convey a message toward these nodes. Express messages 907 indicative of the link failure 905 are illustrated as being transmitted from nodes adjacent to the link failure to nodes in the area 910. These messages are propagated through the data plane (e.g. via other satellites in the illustrated constellation).

It is noted that (in the scenario that the network nodes include satellites) as the satellites move relative to fixed geographic regions on the earth, the table of target nodes held by each network node may be updated dynamically.

According to various embodiments, dynamically selecting target nodes allows optimization of the link state update messaging propagation process, for example to provide rapid network adaptation based on data traffic patterns. Selection of nodes in the table of target nodes can be based on pre-configured indications of targets, traffic measurements, or a combination thereof. When geographic regions are known in advance, the express path connection can be established on an as-needed basis, for example, just before a satellite enters a geographic region.

Figure 10:
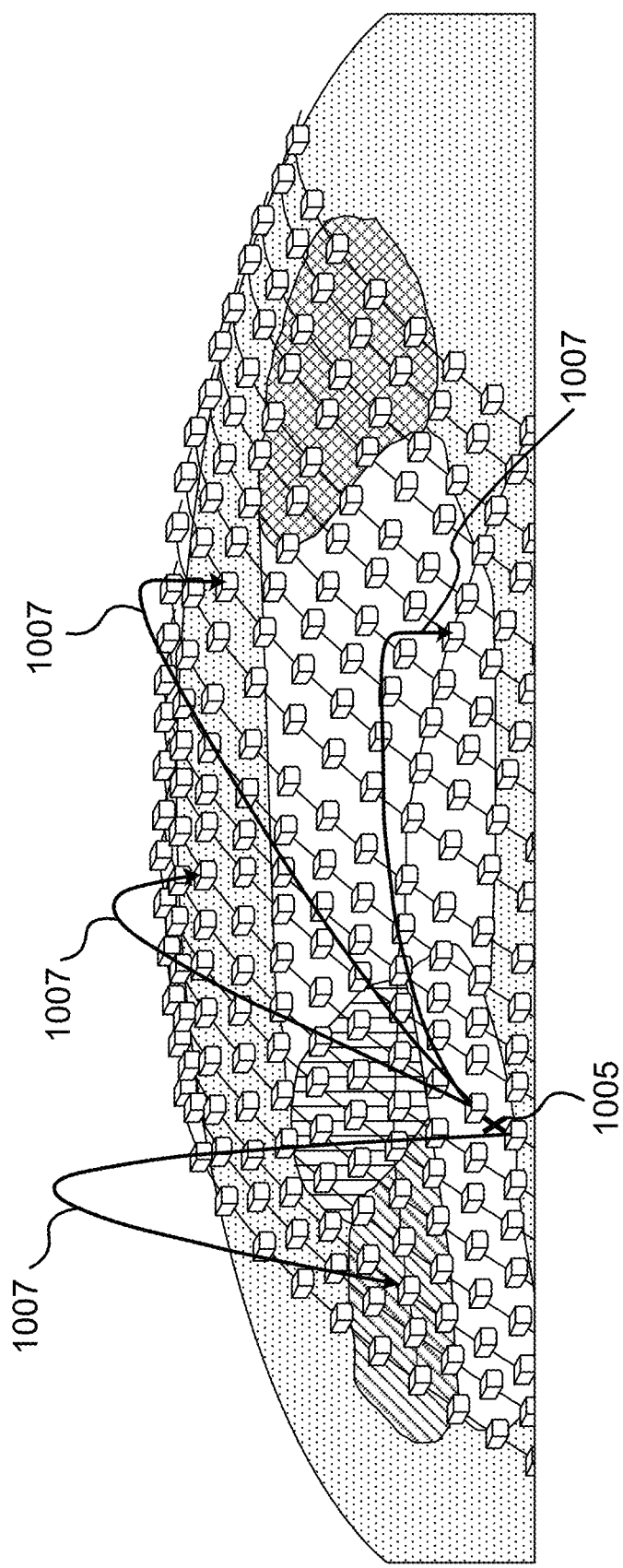
FIG. 10 illustrates a third example case, in which the target nodes are selected based on the network topology only, without respect to geographic considerations, according to an embodiment of the present invention.

FIG. 10 illustrates a third example case, in which the target nodes are selected based on the network topology only, without respect to geographic considerations. For example, each node may select target nodes that are a certain network distance away (e.g. in terms of number of hops or expected transmission delay) from the node. The targets can be equally (evenly) distributed within the network (satellite constellation) so that link state update message delay is substantially minimized on a global scale. In such embodiments, target nodes can be determined substantially independently of network traffic considerations. To achieve low delays for updating link state across the whole network (maximize network convergence speed), express path connections can be pre-established (established prior to detection of link state change). Alternatively, some express path connections can be pre-established while other supplementary express path connections can be established in response to detection of link state changes. In some embodiments, when the network substantially covers a global area, such as in the case of a satellite network, the target nodes may be selected as corresponding to a set of locations regularly spaced around the spherical network covering the globe. The target locations may be substantially equidistant from each other. Express messages 1007 indicative of a link failure 1005 are illustrated as being transmitted from nodes adjacent to the link failure to the remote nodes. These messages are propagated through the data plane (e.g. via other satellites in the illustrated constellation).

In some embodiments, the flooding operation propagates messages along a shortest path tree associated with the routing/forwarding plane of a network node. As will be understood, each network node may include a routing and forwarding table, which defines interfaces usable for reaching different subnets and destinations in the network. The routing and forwarding table can be generated based on a shortest path first (Dijkstra) algorithm, for example, and may be associated with a loop-free tree. The loop-free tree the network node as its root, and all other nodes of the network among its various branches. Therefore, according to some embodiments, a first network node is configured to transmit flood messages (i.e. messages indicating link state change for a communication link local to the first network node) to all other nodes or subnets in its routing table. Accordingly, the flood message traverses the loop-free tree from the first network node to all other nodes in the network. It is noted that this involves the flood message being transmitted to other nodes which are directly connected to the network node (immediate neighbours). This may also involve the flood message being transmitted to other nodes which are indirectly connected to the network node. In some embodiments, the flood message may be communicated to these indirectly connected nodes using express messaging. Furthermore, when the flood messages are propagated along the loop-free tree, every node is reached using its computed shortest path. The flood messages are thus propagated along the forwarding plane tree computed by the network nodes, and the other network nodes receive the flood messages substantially at data plane speed. Advantageously, this approach can use existing configurations and calculations, because the forwarding and routing table is already determined for use in other purposes. Flooding is expedited via the use of the data plane. It is noted that each node subsequently receiving a flood message can repeat the above-described operations to determine which further nodes the flood message is to be forwarded to.

Embodiments of the present invention relate to increasing the stability of the network during topology updates by bypassing (using one or more express paths) the node-by-node message passing behavior of the conventional flooding process.

Network stability during the flooding period can be improved in several ways. Because flooding time depends on the size of the network, one way of reducing flooding duration in terrestrial (fixed) networks is to reduce the flooding area by partitioning the network. For example, IP networks can use a designated router (See the Internet Engineering Task Force (IETF) document numbered RFC 2328 and entitled "OSPF Version 2," 1998) or core routing areas to reduce overall link state traffic that is sent. In a satellite network the selection of a designated router may not be appropriate as the router needs to be established during the initial network deployment. In this case, the motion of the satellite nodes would result in a designated router being located in an area that may become unreachable, and thus would actually extend the time required for the network to recover.

However, because routing tables are generally processed at each node, a method of increasing overall flooding speed is to allow the flooding to start at multiple points in the network. For example, as described above, when a link state change is detected, a control message can be sent to a distant node via an express message. Consequently, the flooding can originate from two locations and occur in two directions simultaneously. As noted above, in the normal flooding process each node will process and then forward the information to the next node. In modern network elements, the data forwarding hardware is designed to minimize the latency and provides near wire-line transfer performance for user data. A control message passed in the data plane can therefore reach a distant node faster than would normal link state flooding.

Unlike a terrestrial network, the topology of a satellite network can be in constant motion relative to the earth's surface, and can cover areas that have varying levels of traffic density. As a result, the failure of individual links may have a different impact depending on the location of the satellite at a given point in time. In some cases, the failure may be within a region that with a high level of local traffic and failure may impact only that local area (e.g. a failure over the Philippines). In other cases it could be on a path that may have a high degree of traffic (for example the New York to London). Still in other cases it could be on a link that has very little local traffic or cross traffic (e.g. between New Zealand and South America).

Sending link state updates directly to remote target satellites via express messaging may improve the overall speed of recovery of the network in the case of network failures. Further, by appropriately selecting target satellites based on network traffic requirements according to certain rules, specific zones and interconnect paths can be made fully functional even though the entire network flooding is incomplete.

Figure 11:
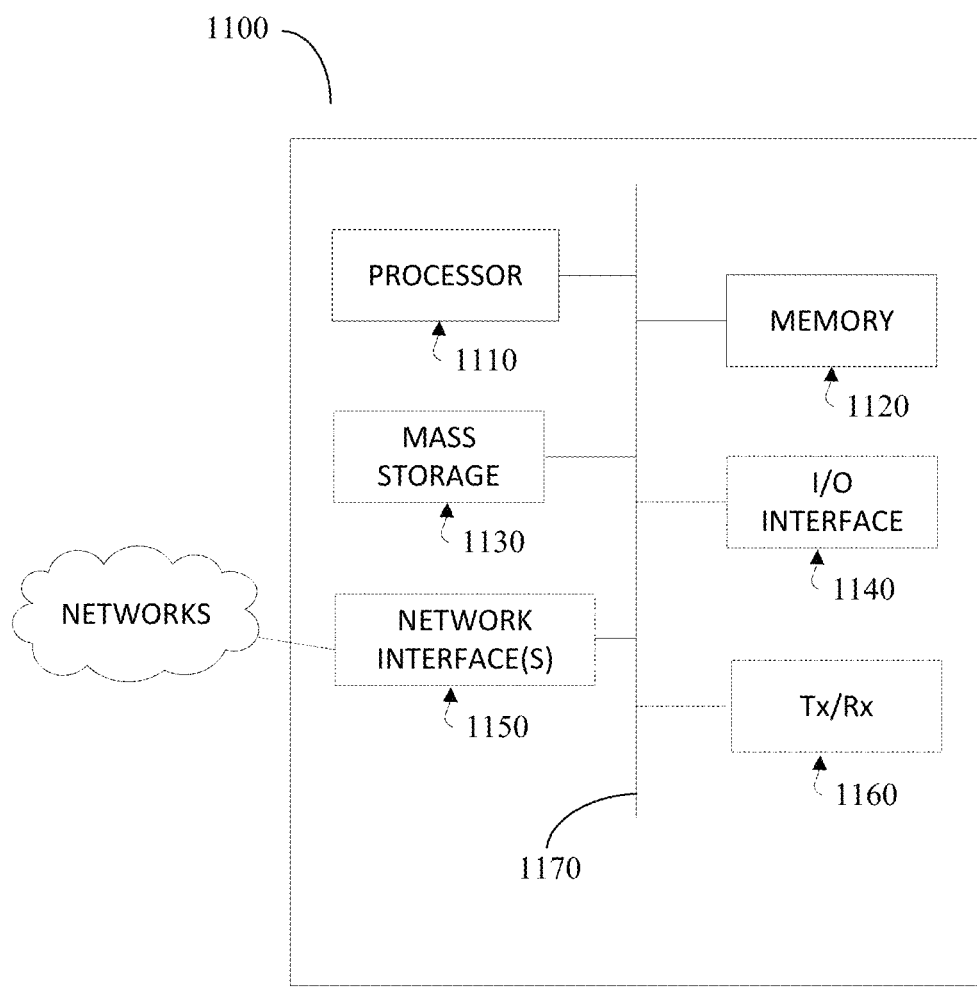
FIG. 11 is a schematic diagram of an electronic device that may perform any or all of operations of the above methods and features explicitly or implicitly described herein, according to different embodiments of the present invention.

FIG. 11 is a schematic diagram of an electronic device 1100 that may perform any or all of operations of the above methods and features explicitly or implicitly described herein, according to different embodiments of the present invention. For example, a computer equipped with network function may be configured as electronic device 1100.

As shown, the device includes a processor 1110, such as a Central Processing Unit (CPU) or specialized processors such as a Graphics Processing Unit (GPU) or other such processor unit, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for distributing information, the method comprising, by a first network node:
   upon detection of a local link state change:
      initiating a flooding operation in which first messages are propagated, via control plane messaging, outward from the first network node to second network nodes which are local to the first network node in a communication network, and thereafter to further network nodes in a hop-by-hop manner, the first messages indicating the local link state change; and
      transmitting, via data plane messaging, a second message to a third network node which is non-adjacent with the first network node, the second message carried as user data and encapsulating a control plane flooding message and the second message configured to cause the third network node to initiate a second flooding operation in which third messages are propagated, via control plane messaging, outward from the third network node to fourth network nodes which are local to the third network node, and thereafter to additional further network nodes in a hop-by-hop manner, the third messages indicating the local link state change, said third messages being based on the encapsulated control plane flooding message, the second message relayed to the third network node via one or more intermediate network nodes, without the second message directly causing the one or more intermediate network nodes to initiate flooding operations, wherein each of the one or more intermediate network nodes participates in the flooding operation, the second flooding operation, or another flooding operation indicating the local link state change, all network nodes including the second network node, the third network node, the fourth network nodes, the further network nodes the additional further network nodes and the one or more intermediate network nodes eventually receive and register the local link state change via either the control plane messaging or the data plane messaging, the all network nodes and the first network node handle said control plane messaging in a same first manner including propagating first messages to all adjacent network nodes which have not previously received the first messages, and the all network nodes and the first network node handle said data plane messaging in a same second manner.

2. The method of claim 1, further comprising selecting the third network node based on an indication of network traffic patterns.

3. The method of claim 2, wherein the third network node is selected as a network node adjacent and/or within a same area, region, or domain to or along a network path which carries heavy network traffic toward the local link, wherein heavy refers to data that exceeds a bandwidth capacity or average flow, or is more than usually observed.

4. The method of claim 1, further comprising selecting the third network node based on physical location, network location, network traffic patterns, or a combination thereof.

5. The method of claim 4, wherein the third network node is selected to be in a region which is different, in a different area, or domain, and/or not adjacent to/from the first network node in terms of network distance.

6. The method of claim 4, wherein the third network node is selected to be in a same region as the first network node, said region circulating a heavy amount of network traffic, wherein heavy refers to data that exceeds a bandwidth capacity or average flow, or is more than usually observed.

7. The method of claim 1, further comprising establishing a network connection between the first network node and the third network node prior to detection of the local link state change.

8. The method of claim 1, further comprising establishing a network connection between the first network node and the third network node in response to detection of the local link state change.

9. The method of claim 1, wherein some or all of the network nodes are satellite-based network nodes.

10. A method for distributing information, the method comprising, by a network node:
   receiving, via data plane messaging, a message from another network node which is non-adjacent with the network node, the message carried as user data and encapsulating a control plane flooding message, the control plane flooding message indicating a link state change for a communication link which is local to the another network node, the message relayed to the network node via one or more intermediate network nodes, without the message directly causing the one or more intermediate network nodes to initiate flooding operations; and upon receipt of the message, initiating a flooding operation in which further messages are propagated, via control plane messaging, outward from the network node to second network nodes which are local to the network node in a communication network, and thereafter to further network nodes in a hop-by-hop manner, the further messages indicating the local link state change, each of the one or more intermediate network nodes participating in the flooding operation or another flooding operation indicative of the link state change, all network nodes including the network node, the one or more intermediate network nodes and the second network nodes eventually receive and register the local link state change via either the control plane messaging or the data plane messaging, the all network nodes and the other network node handle said control plane messaging in a same first manner including propagating first messages to all adjacent nodes which have not previously received the first messages, and the all network nodes and the other network node handle said data plane messaging in a same second manner.

11. An apparatus, the apparatus comprising a network interface and processing electronics, and configured to:
upon detection of a local link state change:
initiate a flooding operation in which first messages are propagated, via control plane messaging and the network interface, outward from the apparatus to second network nodes which are local to the apparatus in a communication network, and thereafter to further network nodes in a hop-by-hop manner, the first messages indicating the local link state change; and transmit, via data plane messaging and the network interface, a second message to a third network node which is non-adjacent with from the apparatus, the second message carried as user data and encapsulating a control plane flooding message and the second message configured to cause the third network node to initiate a second flooding operation in which third messages are propagated, via control plane messaging, outward from the third network node to fourth network nodes which are local to the third network node, and thereafter to additional further network nodes in a hop-by-hop manner, the third messages indicating the local link state change, said third messages being based on the encapsulated control plane flooding message, the second message relayed to the third network node via one or more intermediate network nodes, without the second message directly causing the one or more intermediate network nodes to initiate flooding operations, wherein each of the one or more intermediate network nodes participates in the flooding operation, the second flooding operation, or another flooding operation indicating the local link state change, all network nodes including the second network node, the third network node, the fourth network nodes, the further network nodes and the additional further network nodes and the one or more intermediate nodes eventually receive and register the local link state change via either the control plane messaging or the data plane messaging, the all network nodes and the apparatus handle said control plane messaging in a same first manner including propagating first messages to all adjacent network nodes which have not previously received the first messages, and the all network nodes and the apparatus handle said data plane messaging in a same second manner.

12. The apparatus of claim 11, further configured to select the third network node based on an indication of network traffic patterns.

13. The apparatus of claim 12, wherein the third network node is selected as a network node adjacent and/or within a same area, region, or domain to or along a network path which carries heavy network traffic toward the local link, wherein heavy refers to data that exceeds a bandwidth capacity or average flow, or is more than usually observed.

14. The apparatus of claim 11, further configured to select the third network node based on physical location, network location, network traffic patterns, or a combination thereof.

15. The apparatus of claim 14, wherein the third network node is selected to be in a region which is different, in a different area, or domain, and/or not adjacent to/from the apparatus in terms of network distance.

16. The apparatus of claim 14, wherein the third network node is selected to be in a same region as the apparatus, said region circulating a heavy amount of network traffic, wherein heavy refers to data that exceeds a bandwidth capacity or average flow, or is more than usually observed.

17. The apparatus of claim 11, further configured to establish a network connection between the apparatus and the third network node prior to detection of the local link state change.

18. The apparatus of claim 11, further configured to establish a network connection between the apparatus and the third network node in response to detection of the local link state change.

19. The apparatus of claim 11, wherein some or all of the network nodes are satellite-based network nodes.

20. An apparatus in a first network node, the apparatus comprising a network interface and processing electronics, and configured to:
receive, via data plane messaging, a message from another network node which is non-adjacent with the network node, the message carried as user data and encapsulating a control plane flooding message, the control plane flooding message indicating a link state change for a communication link which is local to the another network node, the message relayed to the network node via one or more intermediate network nodes, without the message directly causing the one or more intermediate network nodes to initiate flooding operations; and upon receipt of the message, initiate a flooding operation in which further messages are propagated, via control plane messaging, outward from the network node to second network nodes which are local to the network node in a communication network, and thereafter to further network nodes in a hop-by-hop manner, the further messages indicating the local link state change, each of the one or more intermediate network nodes participating in the flooding operation or another flooding operation indicative of the link state change, all network nodes including the network node, the one or more intermediate network nodes and the second network nodes eventually receive and register the local link state change via either the control plane messaging or the data plane messaging, the all network nodes and the other network node handle said control plane messaging in a same first manner including propagating first messages to all adjacent nodes which have not previously received the first messages, and the all network nodes and the other network node handle said data plane messaging in a same second manner.

\* \* \* \* \*